(No Model.)
G. F. LITCHARD.
VEHICLE TONGUE SUPPORT.
No. 376,667. Patented Jan. 17, 1888.
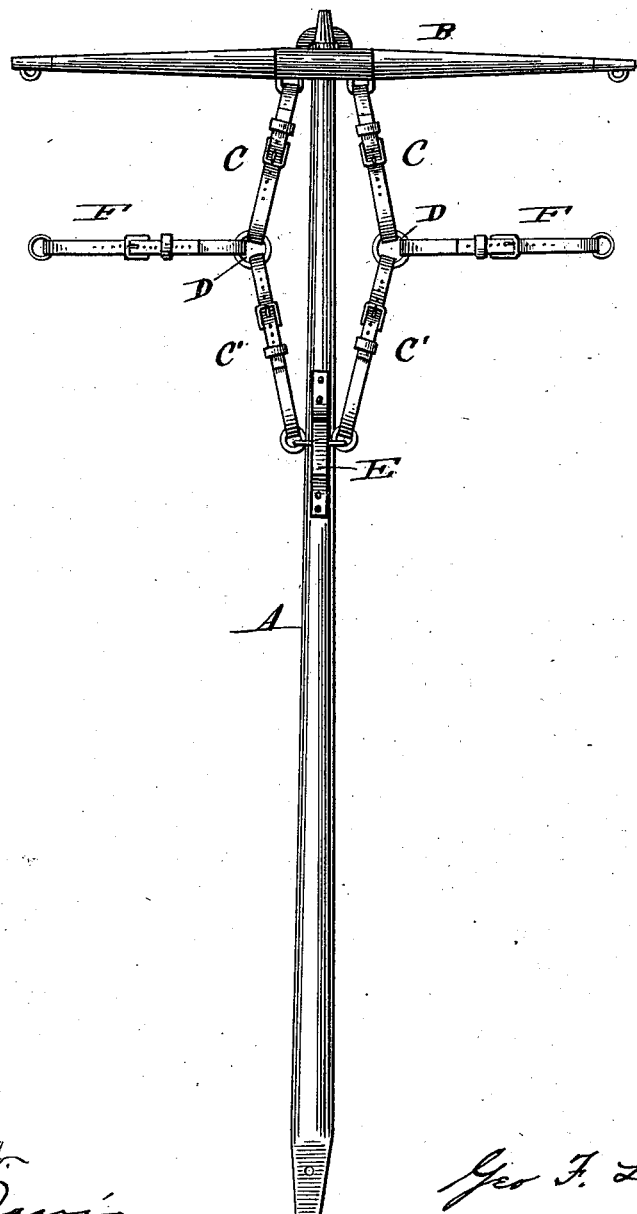
Witnesses
Inventor

UNITED STATES PATENT OFFICE.

GEORGE F. LITCHARD, OF PAW PAW, MICHIGAN.

VEHICLE-TONGUE SUPPORT.

SPECIFICATION forming part of Letters Patent No. 376,667, dated January 17, 1888.

Application filed November 3, 1887. Serial No. 254,181. (No model.)

*To all whom it may concern:*

Be it known that I, GEORGE F. LITCHARD, a citizen of the United States, residing at Paw Paw, in the county of Van Buren and State of Michigan, have invented certain new and useful Improvements in Vehicle-Tongue Supports, of which the following is a specification, reference being had therein to the accompanying drawing.

My invention has relation to certain new and useful improvements in safety devices to be attached to the poles or tongues of vehicles, whereby the pole is prevented from injuring the horses drawing the vehicle when the same is turned around sharp curves or corners, and, also, whereby the pole is prevented from falling to the ground should the breast-chains or the neck-yoke become unhooked or broken, as will be fully understood from the following specification and claim, when taken in connection with the annexed drawing.

The drawing annexed represents a plan view of a pole or tongue detached, and having attached to it my invention.

Referring to the drawing by letter, A designates the pole, and B the neck-yoke attached thereto at its forward end in the usual well-known manner.

Attached to the neck-yoke in close proximity to the pole, one on each side thereof, are two straps, C, which extend rearwardly a short distance, and are attached to two rings or loops, D. Connected to these rings and extending rearwardly therefrom are two straps, C', similar to the straps C, and which are connected at their rear ends by means of rings or clips to a bracket, E, mounted on top of the pole or to the pole itself, as may be desired. Attached to these rings are also two straps, F, which extend out laterally therefrom, and are provided with rings or clips to secure them to the inner tug-staples of the respective hames of the horses.

The straps C, C', and F may all be provided with buckles, as shown, or other similar means, whereby the device may be adjusted to suit different horses, should it be desired or necessary.

It will be observed that should the breast-chains or neck-yoke become disengaged or broken while in use the pole or tongue will be held up in its normal position between the horses and prevented from falling to the ground by means of the arrangement of straps, thus obviating the serious danger from runaway accidents which are quite frequent with the ordinary method of supporting the pole, in which, should anything become broken or disengaged, it falls to the ground and frightens the horses, as is well known.

The device also prevents the pole or tongue from striking against the horses and thus injuring them when the vehicle or machine to which the pole is attached is turned around, the pole being held in its normal position between the horses.

Having thus fully described my invention, what I claim as new, and desire to secure by Letters Patent, is—

The combination, with the pole or tongue and neck-yoke, of the straps C C, attached to the neck-yoke, the ring-connections D D, attached to the straps C C, the straps C' C', attached to the said rings and to the vehicle-pole, and the straps F F, also attached to the said ring-connections and provided with means of attachment to the hames, substantially as described.

In testimony whereof I affix my signature in presence of two witnesses.

GEORGE F. LITCHARD.

Witnesses:
MARCUS I. LITCHARD,
CHS. E. GALLIGAN.